US012279098B2

(12) United States Patent
Rossholm et al.

(10) Patent No.: US 12,279,098 B2
(45) Date of Patent: Apr. 15, 2025

(54) SYSTEMS, METHODS AND COMPUTER PROGRAM PRODUCTS FOR SELECTING AUDIO FILTERS

(71) Applicant: Spotify AB, Stockholm (SE)

(72) Inventors: Andreas Rossholm, Stockholm (SE); Richard Mitic, Stockholm (SE)

(73) Assignee: Spotify AB, Stockholm (SE)

( * ) Notice: Subject to any disclaimer, the term of this patent is extended or adjusted under 35 U.S.C. 154(b) by 119 days.

(21) Appl. No.: 18/147,113

(22) Filed: Dec. 28, 2022

(65) Prior Publication Data

US 2024/0223951 A1 Jul. 4, 2024

(51) Int. Cl.
*H04R 5/02* (2006.01)
*H04R 5/033* (2006.01)
*H04R 5/04* (2006.01)

(52) U.S. Cl.
CPC ............... *H04R 5/02* (2013.01); *H04R 5/033* (2013.01); *H04R 5/04* (2013.01)

(58) Field of Classification Search
CPC . H04R 5/02; H04R 5/033; H04R 5/04; H04R 29/001–008
USPC ............................................... 381/58, 59, 96
See application file for complete search history.

(56) References Cited

U.S. PATENT DOCUMENTS 8,045,722 B2 * 10/2011 Choi ....................... H04S 3/002 700/55
9,031,268 B2 * 5/2015 Fejzo ...................... H04S 7/303 381/310
10,770,044 B2 * 9/2020 Nazer ..................... G06F 17/18
11,044,569 B2 6/2021 Bittner
11,276,215 B1 * 3/2022 Grossinger ............ H04R 1/028
12,010,494 B1 * 6/2024 Satongar .................. H04R 5/04
2008/0300702 A1 12/2008 Gomez
2014/0105406 A1 * 4/2014 Ojanpera ............... H04R 3/005 381/56
2015/0189455 A1 * 7/2015 Donaldson ............ H04R 27/00 381/77
2017/0309297 A1 10/2017 Arsikere
(Continued)

OTHER PUBLICATIONS

Best, Virginia & Baumgartner, Robert & Lavandier, Mathieu & Majdak, Piotr & Kopco, Norbert. (2020). Sound Externalization: A Review of Recent Research. Trends in hearing. 24. 2331216520948390. 10.1177/2331216520948390.
(Continued)

*Primary Examiner* — Xu Mei
(74) *Attorney, Agent, or Firm* — McDonnell Boehnen Hulbert & Berghoff LLP

(57) ABSTRACT

A training audio track feature vector is generated for training audio tracks. The training audio track feature vector includes training track vector components based on one or more feature sets. Each of the training track vector components is grouped into at least one cluster. Audio filters are mapped to one or more of the clusters, thereby building a feature-filter mapping function. Mapping functions from filters to audio output devices and/or physical space acoustic features can also be built. A media playback device receives the mapping function(s) and is enabled to apply the mapping function(s) to a query audio track feature vector to identify at least one audio filter corresponding to the query audio track. The media playback device can then apply the at least one audio filter to the query audio track.

20 Claims, 7 Drawing Sheets

(56) References Cited

U.S. PATENT DOCUMENTS

| | | | | |
|---|---|---|---|---|
| 2018/0182394 | A1 | 6/2018 | Hulaud | |
| 2019/0313201 | A1 | 10/2019 | Torres | |
| 2020/0168208 | A1 | 5/2020 | Mitra | |
| 2020/0374648 | A1 * | 11/2020 | Robinson | H04R 5/04 |
| 2022/0086591 | A1 | 3/2022 | Hassager | |

OTHER PUBLICATIONS

Enric Guaus i Termens, Audio content processing for automatic music genre classification: descriptors, databases, and classifiers, Doctoral Dissertation, Department of Information and Communication Technologies at the Universitat Pompeu Fabra, 2009.

Härmä, Aki. (2011). Stereo audio classification for audio enhancement. Acoustics, Speech, and Signal Processing, 1988. ICASSP-88., 1988 International Conference on. 457-460. 10.1109/ICASSP.2011.5946439.

Kim, YongGuk & Chun, Chan & Kim, Hong Kook & Lee, Y. & Jang, Daeyoung & Kang, Kyeongok. (2010). An Integrated Approach of 3D Sound Rendering Techniques for Sound Externalization. 682-693. 10.1007/978-3-642-15696-0_63.

Song Li, Robert Baumgartner and Jürgen Peissig, Modeling perceived externalization of a static, lateral sound image, Acta Acust., 4 5 (2020) 21, DOI: https://doi.org/10.1051/aacus/2020020.

Yuan, Y., Xie, L., Fu, ZH. et al. Sound image externalization for headphone based real-time 3D audio. Front. Comput. Sci. 11, 419-428 (2017). https://doi.org/10.1007/s11704-016-6182-2.

* cited by examiner

SYSTEMS, METHODS AND COMPUTER PROGRAM PRODUCTS FOR SELECTING AUDIO FILTERS

TECHNICAL FIELD

Example aspects described herein relate generally to audio signal processing, and more particularly to selecting audio signal processing filters capable of being applied by media playback devices to audio tracks.

BACKGROUND

Media playback devices, usually embodied in smartphones, vehicle sound systems, computers, smart speakers, smart displays and the like have become more and more ubiquitous. Enabled by increased processing power, memory capacity, and powerful audio coding methods, these devices can reproduce rich content.

The headphones or speakers used in conjunction with media playback devices can, however, have an effect on audio perception of audio content. For example, when using headphones, the sound may appear to be localized in the head and the sound field is flat and lacking the sensation of dimensions.

When listening using speakers, the sound may sound different depending on the environment. For example, an automobile or a room will usually color a sound in distinct ways as a result of sound reflecting off of various room surfaces. This is commonly referred to as "room modes."

Moreover, the features of an audio track itself will also cause an audio track to sound differently depending on the audio output device used and/or the listening environment. Some audio tracks are in fact created to be listened using a particular type of output device (e.g., headphone vs. speaker) and environment (small room vs. large room).

Equalizers are often utilized to adjust sound levels of different sound frequencies. Digital signal processing filters also have been used to compensate for the limitations of devices or listening environment impact as well as in conjunction with the theory of psychoacoustics to adjust how audio tracks are perceived as well.

Audio tracks can sound or otherwise be perceived very differently depending on the processing algorithm used. In some cases, altering the sound can introduce tonal changes that can not only sound very different, but even be annoying and make the outcome worse than the original unprocessed audio.

Thus, an audio track can sound or be perceived differently depending on various factors, including the playback device hardware, listening environment, the attributes of the audio track itself and/or equalization or filtering applied. This typically results in a more conservative setting overall than an optimization where the flavor is picked individually based on the feature of the audio content. Further, typical media playback devices have a relatively limited number of preconfigured audio filter options available to listeners.

Existing solutions are typically non-technical in that they involve subjective measures obtained through listening tests performed by people. Such subjective measures include, for example, phones and sones for sound level. Perceived sound frequency has also many different scales, some derived from listening tests, others having connections to auditory models and physiological features of the cochlea in the inner ear. For subjective frequency scales, most commonly used are the so-called Bark, Mel or ERB scales. Data corresponding to the filtering that testers choose is analyzed. However, oftentimes, the testers end up choosing a particular audio filter randomly or making too conservative of a decision. Thus, not only is such testing too subjective, but it is also not scalable. Moreover, the data necessary to analyze the filtering testers choose is oftentimes not available. In sum, the confidence level that the subjective testers will choose the correct audio filtering is relatively low. Nor do existing systems determine which audio filtering to use by taking into account the features of the audio content itself and/or the features of the playback device components to optimize the filtering.

SUMMARY

The example embodiments described herein meet the above-identified needs by providing methods, systems and non-transitory computer-readable medium for sound filtering selection. The example method involves, for each training audio track of a plurality of training audio tracks: generating a training audio track feature vector including a plurality of training track vector components based on one or more feature sets; grouping each of the plurality of training track vector components of the training audio track feature vector into at least one of a plurality of clusters; mapping a first set of audio filters to one or more of the plurality of clusters, thereby building a feature-to-filter mapping function from each training audio track feature vector to at least one audio filter; and provisioning the feature-to-filter mapping function to a media playback device enabled to apply the feature-to-filter mapping function to a query audio track to select a filter from the first set of audio filters.

In some embodiments, the method further involves mapping a second set of audio filters to a plurality of types of audio output devices, thereby building an audio output device to-filter mapping function; and provisioning the audio output device-to-filter mapping function to the media playback device, wherein the mobile device is enabled to apply the audio output device-to-filter mapping function to the query audio track to select a filter from the second set of audio filters.

In some embodiments, the method further involves: obtaining an audio output device type associated with a type of audio output device of the media playback device; and causing the media playback device applying the audio output device-to-filter mapping function to the query audio track according to the audio output device type.

In some embodiments, the method further involves: mapping a third set of audio filters to a plurality of physical space acoustics features, thereby building a physical space acoustics-filter mapping function; and provisioning the physical space acoustics-to-filter mapping function to the media playback device, wherein the mobile device is enabled to apply the physical space acoustics-to-filter mapping function to the query audio track to select a filter from the third set of audio filters. In some embodiments, the method further involves: obtaining a physical space acoustics feature representing a physical space; and causing the media playback device to apply the physical space acoustics-to-filter mapping function to the query audio track based on the physical space acoustics feature representing the physical space in which the query audio track is playing.

In some embodiments, the method further involves: obtaining a query audio track feature vector corresponding to the query audio track, where the query audio track feature vector is based on any one or a combination of the feature sets associated with the query audio track; applying the feature-filter mapping function to the query audio track feature vector to identify at least one audio filter corresponding to the query audio track; and causing the media playback device to apply the at least one audio filter to the query audio track. In some embodiments, the method further involves: causing the media playback device to apply the at least one audio filter to each audio track in a media context including the query audio track.

The example system for performing sound filtering selection involves: a training track feature classifier operable to: for each training audio track of a plurality of training audio tracks, generate a training audio track feature vector including a plurality of training track vector components based on one or more feature sets; a cluster generator operable to group each of the plurality of training track vector components of the training audio track feature vector into at least one of a plurality of clusters; a mapper operable to map a first set of audio filters to one or more of the plurality of clusters, thereby building a feature-to-filter mapping function from each training audio track feature vector to at least one audio filter; a mapping function store operable to store the mapping function; and an audio filter server operable to provision the feature-to-filter mapping function to a media playback device enabled to apply the feature-to-filter mapping function to a query audio track.

In some embodiments, the mapper is further operable to: map a second set of audio filters to a plurality of types of audio output devices, thereby building an audio output device-to-filter mapping function; and the audio filter server is further operable to provision the audio output device-to-filter mapping function to the media playback device, wherein the media playback device is enabled to apply the audio output device-to-filter mapping function to the query audio track.

In some embodiments, the system further comprises: an audio output device detector operable to: obtain an audio output device type associated with a type of audio output device of the media playback device; and a sound processor operable to: apply the audio output device-to-filter mapping function to the query audio track according to the audio output device type.

In some embodiments, the mapper is further operable to: map a third set of audio filters to a plurality of physical space acoustics features, thereby building a physical space acoustics-to-filter mapping function; and the system further comprise an audio filter server operable to provision the physical space acoustics-to-filter mapping function to the media playback device, wherein the media playback device is enabled to apply the physical space acoustics-to-filter mapping function to the query audio track.

In some embodiments, the system further comprises: an acoustic frequency response analyzer operable to obtain a physical space acoustics feature representing a physical space; and a sound processor operable to apply the physical space acoustics-to-filter mapping function to the query audio track based on the physical space acoustics feature representing the physical space.

In some embodiments, the system further comprises: a query vector receiver operable to obtain a query audio track feature vector corresponding to the query audio track, where the query audio track feature vector is based on any one or a combination of the feature sets associated with the query audio track; and a sound processor operable to apply the mapping function to the query audio track feature vector to identify at least one audio filter corresponding to the query audio track, and apply the at least one audio filter to the query audio track.

In some embodiments, the sound processor is further operable to apply the at least one audio filter to each audio track in a media context including the query audio track.

In some embodiments, the type of audio output device is any one of (i) a headphone or (ii) one or more speakers. In some embodiments, the one or more feature sets include any one of: (i) an acoustic vector of the audio track, (ii) an emotional quality vector of the audio track, (iii) a vocal quality vector of the audio track, (iv) a sound quality vector of the audio track, (v) a situational quality vector of the audio track, (vi) a genre vector of the audio track, (vi) an ensemble vector of the audio track, or (vii) an instrument vector of the audio track, or (viii) or a combination thereof.

The example non-transitory computer-readable medium has stored thereon sequences of instructions, the sequences of instructions including instructions which when executed by one or more processes cause the one or more processors to perform any one of the methods described herein.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

Figure 1:
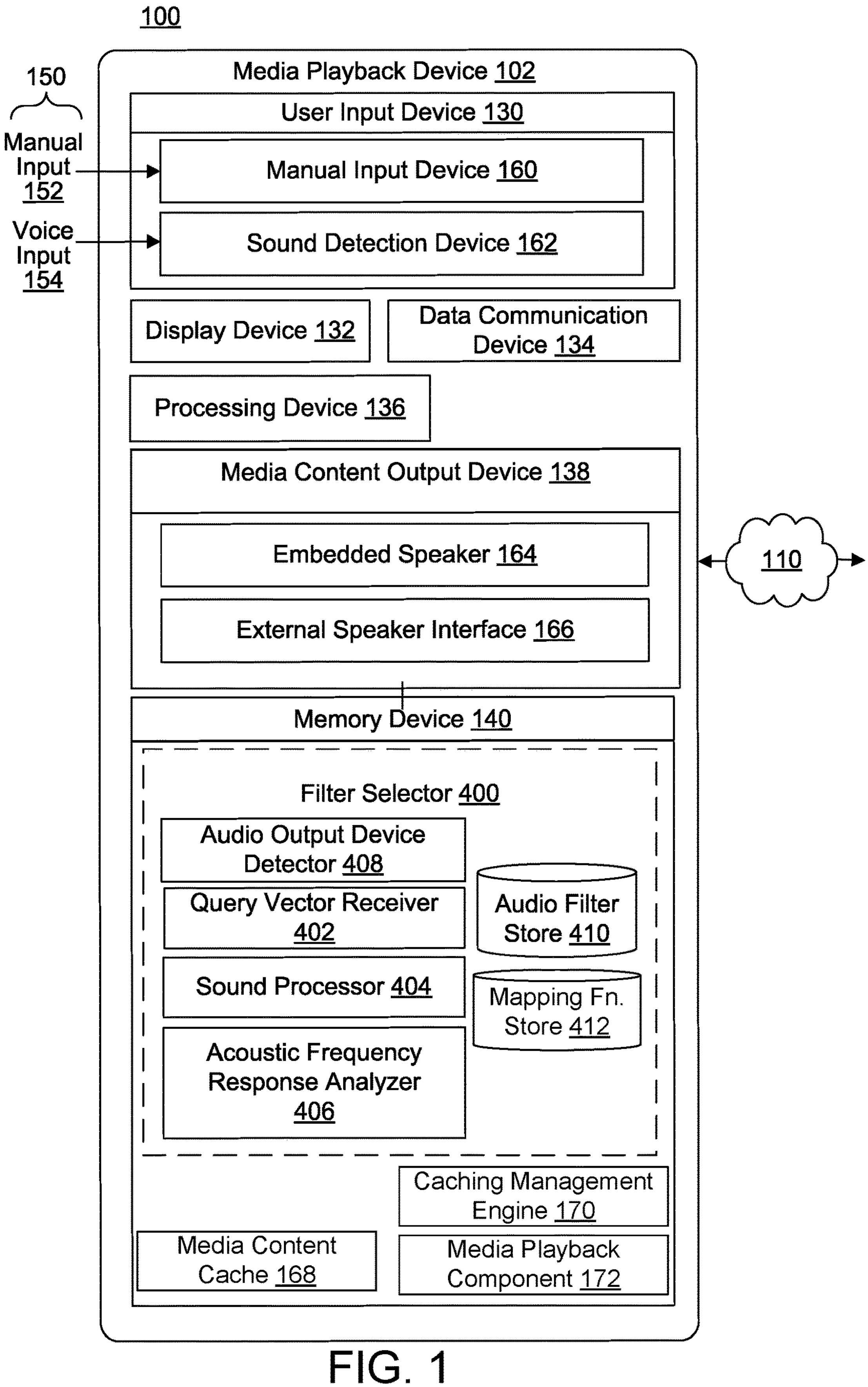
FIG. 1 illustrates a media playback device according to an example embodiment.

Generally, the systems, methods and computer program products described herein involve generating one or more mapping functions, where each mapping function defines relationships between an audio track and one or more sets of audio filters, where each set of filters corresponds to 0 to N audio filters, where N is an integer. The mapping function can, in turn, be applied to an audio track to select an audio filter. The selected audio filter is, in turn, applied to the audio track during its playback by a media playback device that has been provisioned with the mapping function(s).

A feature as used herein generally means a measurable piece of data that can be used for analysis. A feature can include, for example, a measurable property, attribute, and/or characteristic. In some embodiments, a feature can be described by a feature vector.

There can be different types of mapping functions. One type of mapping function, referred to as a feature-to-filter mapping function or first mapping function, is generated by collecting various features of training tracks and features of audio filters, and mapping these features to produce the feature-to-filter mapping function. It should be understood that a mapping function as used herein can be a one-to-one function, a one-to-many function, or a many-to-many function.

Audio filters have the ability to, for example, transform the tone of audio. One example audio feature is the extent to which an audio filters can enhance the level of existing frequencies (e.g., by isolating, lowering, boosting, etc. one or more frequencies). Other example audio filter features include cutoff frequency, resonance, mode, slope, smoothness, and/or isolation features. Still other example audio filter features include spatial filtering features, externalization features, noise cancellation features, and the like. There exist many different audio filter types that serve different purposes, each with its own set of features. Now known or future developed audio filters can be applied to audio signals in accordance with the embodiments described herein.

In an example implementation, a feature-to-filter mapping function is a mapping between data that describes information about the media content item and/or the media content itself (e.g., media content item metadata represented by feature vectors) associated with a media content item (e.g., genre features, vocalness features, instrument features, stereo imaging features, etc.) to audio filter features associated with an audio filter. When the audio filter selected by using the feature-to-filter mapping function is applied to the audio signals of the media content item, the audio filters enhance or accentuate different characteristics of the audio signals for the purpose of changing perceptual quality taking into consideration the features of the media content item. An audio perceptual quality can be, for example, a measure of the perceptual impact of audio signals (e.g., media content audio signals) and how it effects the enjoyment or interpretation of the audio signals.

Another example type of mapping function, referred to as an audio output device-to-filter mapping function or second mapping function, is generated by collecting various features of audio output devices and the features of audio filters, and mapping these features to produce the audio output device-to-filter mapping function. Example features of an audio output device (i.e., audio output device features) include: number of speakers, frequency response, frequency range, useable frequency range, sensitivity, power handling, type of audio output device(s) (e.g., tower speakers, bookshelf speakers, surround speakers, center-channel speakers, soundbar-type speakers, headphones (e.g., in-ear type, over-ear type, bone-conduction, and the like)), known application (e.g., for indoor use, for outdoor use, for use in an automobile, for use in sound studio, for use in movie theater, etc.) and the like.

In an example implementation, a device-to-filter mapping function is a mapping between a type of audio output device (i.e., audio output device type) defined by the features of the audio output device to audio filter features associated with an audio filter. When the audio filter selected using the device-to-filter mapping function is applied to the audio signals of the content item, the audio filters enhance or accentuate different characteristics of the audio signals for the purpose of changing perceptual quality taking into consideration the features of the audio output device.

Yet another example type of mapping function, referred to as a physical space acoustics-to-filter mapping function or third mapping function, is generated by collecting various features of physical space acoustics (e.g., room acoustics) and the features of audio filters, and mapping these features to produce the physical space acoustics-to-filter mapping function. Acoustics are the way sound waves interact with the space around them. When something emits a sound, such as a speaker, it projects sound waves outward. The waves make contact with a variety of different surfaces, such as walls, ceilings, chairs, car seats, couches, tables, etc. How the waves interact with those surfaces depends on the nature of the surface. Example physical space acoustics features include space type (e.g., living room, automobile, stadium, theatre, relatively small room, relatively large room, relatively low ceilings, relatively normal ceiling, relatively high ceilings, etc.), reverberation time, level of echo, measurement of sound distribution, background noise, and the like.

In an example implementation, a physical space acoustics-to-filter mapping function is a mapping between physical space acoustics features to audio filter features associated with an audio filter. When the audio filter selected using the physical space acoustics-to-filter mapping function is applied to the audio signals of the content item played back through the audio output device, the audio filters enhance or accentuate different characteristics of the audio signals for the purpose of changing perceptual quality taking into consideration the features of the physical space acoustics.

One or more of the mapping functions can be used independently or in combination.

A mapping function may then be provisioned onto a media playback device and used to select an audio filter based on a query audio track to be played back by the media playback device. In some embodiments the mapping function is stored on a media delivery system which, in turn, is used to select the audio filter based on a query audio track to be delivered to the media playback device. The media delivery system can instruct the media playback device which filter to use (i.e., the selected filter) for example, by communicating an audio filter identifier to the media playback device.

An "audio filter" as used herein includes a digital audio filter, an analog audio filter, an audio equalizer, an audio signal processor, and the like.

In some embodiments, the different mapping functions can be applied independently. For example, if only room acoustics are of interest to a listener, then the physical space acoustics-to-filter mapping function can be selected without regard to any other type of mapping function that is available. In some embodiments, the different types of mapping functions are applied in a cascaded fashion, such that the most appropriate audio filter is selected. Accordingly, each mapping function may map particular features (e.g., track features, audio output device features, physical space features) to an associated set of audio filters (e.g., a first set of audio filters, a second set of audio filters, a third set of audio filters, etc.), where the sets of audio filters may or may not identify the same audio filters. Other useful features can be provided through the use of mapping functions.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

Example Media Content Provision System

Figure 2:
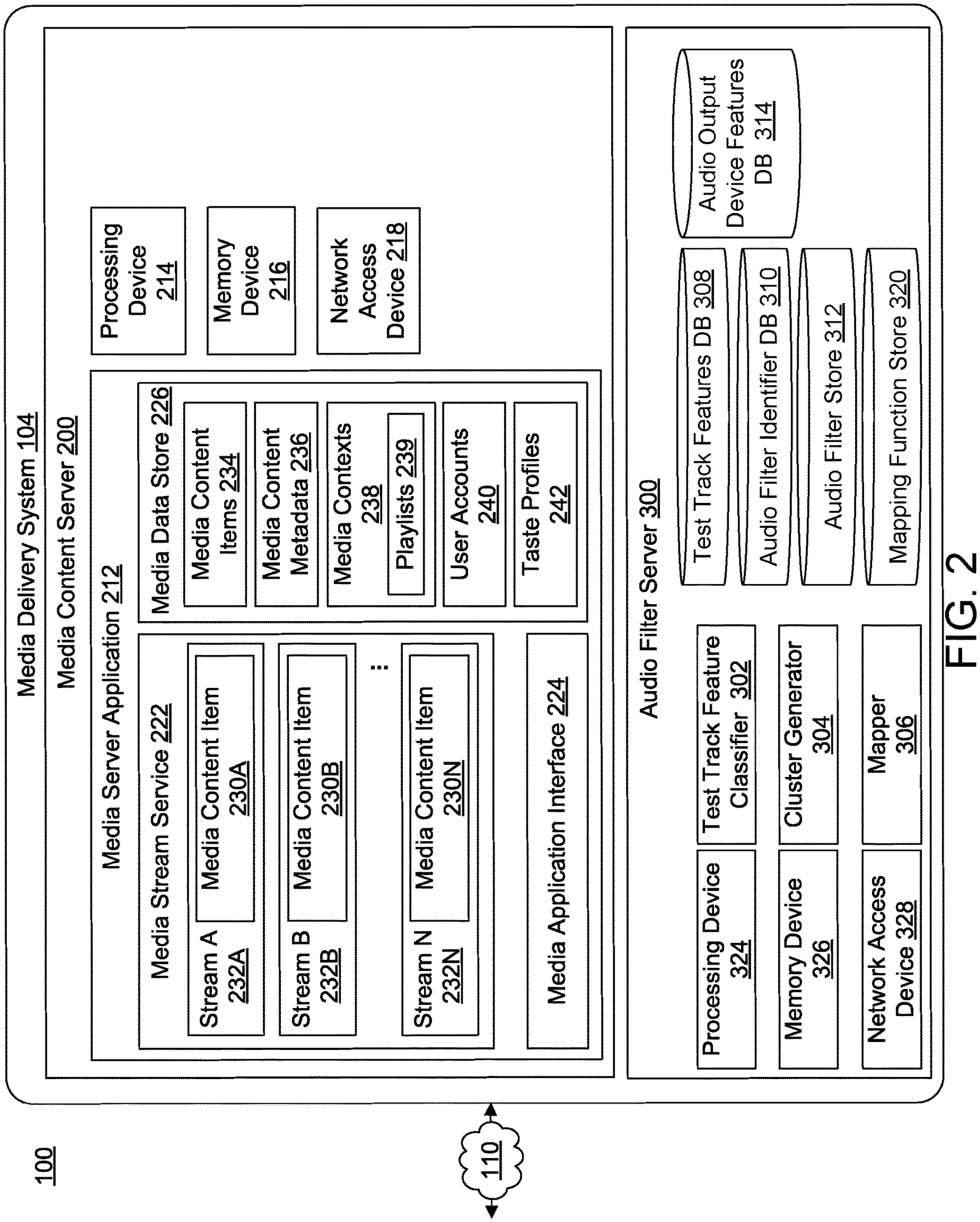
FIG. 2 illustrates a media delivery system according to an example embodiment.

FIG. 1 and FIG. 2 in combination is a block diagram of an example media content provision system.

Example Media Playback Device

FIG. 1 illustrates a media playback device according to an example embodiment. In this example, media playback device 102 includes a user input device 130, a display device 132, a data communication device 134, a processing device 136, a media content output device 138, and a memory device 140.

The media playback device 102 operates to play media content. For example, the media playback device 102 is configured to play media content that is provided (e.g., streamed or transmitted) by a system external to the media playback device 102, such as the media delivery system 104 of FIG. 2, another system, or a peer device. In other examples, the media playback device 102 operates to play media content stored locally on the media playback device 102. In yet other examples, the media playback device 102 operates to play media content that is stored locally as well as media content provided by other systems. It should be understood that for simplicity FIG. 1 illustrates only one media playback device 102. However, it is envisioned that multiple media playback devices 102 are in use in media content provision system 100.

In some embodiments, the media playback device 102 is a handheld or portable entertainment device, smartphone, tablet, watch, wearable device, or any other type of computing device capable of playing media content. In other embodiments, the media playback device 102 is a laptop computer, desktop computer, television, gaming console, set-top box, network appliance, Blu-ray or DVD player, media player, stereo, or radio.

In some embodiments, the media playback device 102 is a system dedicated for streaming personalized media content in a vehicle environment.

The user input device 130 operates to receive a user input 150 for controlling the media playback device 102. As illustrated, the user input 150 can include a manual input 152 and a voice input 154. In some embodiments, the user input device 130 includes a manual input device 160 and a sound detection device 162.

The manual input device 160 operates to receive the manual input 152 for controlling playback of media content via the media playback device 102. In some embodiments, the manual input device 160 includes one or more buttons, keys, touch levers, switches, and/or other mechanical input devices for receiving the manual input 152. For example, the manual input device 160 includes a text entry interface, such as a mechanical keyboard, a virtual keyboard, or a handwriting input device, which is configured to receive a text input, such as a text version of a user query. In addition, in some embodiments, the manual input 152 is received for managing various pieces of information transmitted via the media playback device 102 and/or controlling other functions or aspects associated with the media playback device 102.

The sound detection device 162 operates to detect and record sounds from proximate to the media playback device 102. For example, the sound detection device 162 can detect sounds including the voice input 154. In some embodiments, the sound detection device 162 includes one or more acoustic sensors configured to detect sounds proximate the media playback device 102. For example, acoustic sensors of the sound detection device 162 include one or more microphones or a combination of microphones as a microphone array. Various types of microphones can be used for the sound detection device 162 of the media playback device 102.

In some embodiments, the voice input 154 is a user's voice (also referred to herein as an utterance) for controlling playback of media content via the media playback device 102. For example, the voice input 154 includes a voice version of the user query received from the sound detection device 162 of the media playback device 102. In addition, the voice input 154 is a user's voice for managing various data transmitted via the media playback device 102 and/or controlling other functions or aspects associated with the media playback device 102.

Media playback device 102 can detect the various actions taken in connection with the media content. For example, music playback applications include functions such as rewind, forward, pause, stop, and skip.

Referring still to FIG. 1, the display device 132 operates to display information. Examples of such information include media content playback information, notifications, and other information. In some embodiments, the display device 132 is configured as a touch sensitive display and includes the manual input device 160 of the user input device 130 for receiving the manual input 152 from a selector (e.g., a finger, stylus etc.) controlled by a user. In some embodiments, therefore, the display device 132 operates as both a display device and a user input device. The display device 132 operates to detect inputs based on one or both of touches and near-touches. In some embodiments, the display device 132 displays a graphical user interface for interacting with the media playback device 102. Other embodiments of the display device 132 do not include a touch sensitive display screen. Some embodiments include a display device and one or more separate user interface devices. Further, some embodiments do not include a display device.

The data communication device 134 operates to enable the media playback device 102 to communicate with one or more computing devices over one or more networks, such as the network 110. For example, the data communication device 134 is configured to communicate with the media delivery system 104 of FIG. 2 and receive media content from the media delivery system 104 at least partially via the network 110. The data communication device 134 can be a network interface of various types which connects the media playback device 102 to the network 110. Examples of the data communication device 134 include wired network interfaces and wireless network interfaces. Wireless network interfaces includes infrared, BLUETOOTH® wireless technology, 802.11a/b/g/n/ac, and cellular or other radio frequency interfaces in at least some possible embodiments. Examples of cellular network technologies include LTE, WiMAX, UMTS, CDMA2000, GSM, cellular digital packet data (CDPD), and Mobitex.

The media content output device 138 operates to output media content. In some embodiments, the media content output device 138 includes one or more embedded speakers 164 which are incorporated in the media playback device 102.

Alternatively, or in addition, some embodiments of the media playback device 102 include an external speaker interface 166 as an alternative output of media content. The external speaker interface 166 is configured to connect the media playback device 102 to another system having one or more speakers, such as headphones, a portal speaker, and a vehicle entertainment system, so that media output is generated via the speakers of the other system external to the media playback device 102. Examples of the external speaker interface 166 include an audio output jack, a USB port, a Bluetooth transmitter, a display panel, and a video output jack. Other embodiments are possible as well. For example, the external speaker interface 166 is configured to transmit a signal that can be used to reproduce an audio signal by a connected or paired device such as headphones or a speaker.

The processing device 136, in some embodiments, includes one or more central processing units (CPU). In other embodiments, the processing device 136 additionally or alternatively includes one or more digital signal processors, field-programmable gate arrays, graphic processing units (GPUs) or other electronic circuits.

The memory device 140 typically includes at least some form of computer-readable media. The memory device 140 can include at least one data storage device. Computer readable media includes any available non-transitory media that can be accessed by the media playback device 102. By way of example, computer-readable media includes computer readable storage media and computer readable communication media.

Computer readable storage media includes non-transitory volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the media playback device 102. In some embodiments, computer readable storage media is non-transitory computer readable storage media. The non-transitory computer-readable medium has stored thereon instructions which, when executed by one or more processors (or one or more computers), cause the one or more processors (or one or more computers) to perform the methods described herein.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its feature set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 140 operates to store data and instructions. In some embodiments, the memory device 140 stores instructions for a media content cache 168, a caching management engine 170, and a media playback component 172.

Some embodiments of the memory device 140 include the media content cache 168. The media content cache 168 stores media content items, such as media content items that have been received from the media delivery system 104. The media content items stored in the media content cache 168 may be stored in an encrypted or unencrypted format. Metadata is a set of data that describes and give information about other data. With respect to media content, metadata is data that describes information about the media content item and/or the media content itself. In some embodiments, the media content cache 168 also stores metadata about media content items such as title, artist name, album name, length, genre, mood, era, etc. The media content cache 168 can further store playback information about the media content items and/or other information associated with the media content items.

In some examples, media content is identifiable through the use of a media content item identifier. Media content is thus retrievable for playback via the use of a media content item identifier. Other media content playback retrieval mechanisms now know or future developed can be used. Individual media content can be referred to as a media object, media content item, or multimedia object. Examples of media content include, songs, albums, music videos, podcasts, audiobooks, movies, radio stations, TV stations, TV shows, books, video games and the like. One or more media content item identifiers can be grouped together to form a media content context, such as a playlist, album, search result list, or season, among others.

The caching management engine 170 is configured to receive and cache media content in the media content cache 168 and manage the media content stored in the media content cache 168. In some embodiments, when media content is streamed from the media delivery system 104, the caching management engine 170 operates to cache at least a portion of the media content into the media content cache 168. In other embodiments, the caching management engine 170 operates to cache at least a portion of media content into the media content cache 168 while online so that the cached media content is retrieved for playback while the media playback device 102 is offline.

The media playback component 172 operates to play media content. As described herein, the media playback component 172 is configured to communicate with the media delivery system 104 to receive one or more media content items (e.g., through the media stream 232 of FIG. 2). In other embodiments, the media playback component 172 is configured to play media content that is locally stored in the media playback device 102.

In some embodiments, the media playback component 172 operates to retrieve one or more media content items that are either locally stored in the media playback device 102 or remotely stored in the media delivery system 104. In some embodiments, the media playback component 172 is configured to send a request to the media delivery system 104 for media content items and receive information about such media content items for playback.

Example Filter Selector

Figure 4:
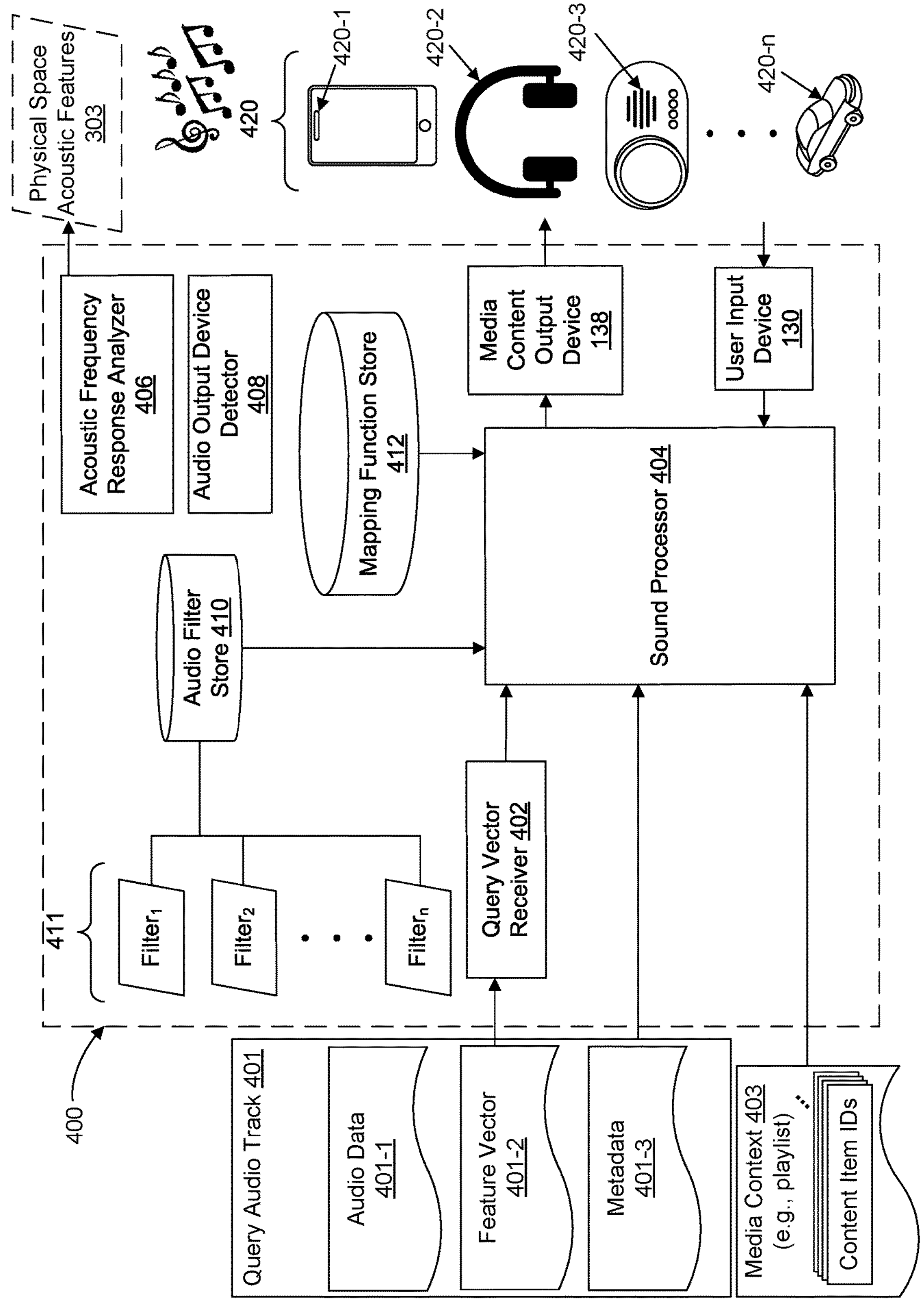
FIG. 4 illustrates an example filter selector in accordance with an example embodiment.

Referring to FIG. 1 and FIG. 4, media playback device 102, in some embodiments, further includes a filter selector 400. In some embodiments, filter selector 400 includes a query vector receiver 402 and a sound processor 404. In some embodiments, filter selector 400 further includes an acoustic frequency response analyzer 406. In still other embodiments, filter selector 400 includes an audio output device detector 408.

Filter selector 400 may further include an audio filter store 410 and a mapping function store 412. Audio filter store 410 operates to store audio filters that can be applied to a query audio track such as a media content item 230A, 230B, . . . , 230N obtained (e.g., downloaded or streamed) from media delivery system 104 described in connection with FIG. 2. Mapping function store 412 operates to store (depending on the implementation) any one of (i) a feature-to-filter mapping function(s), (ii) audio output device-to-filter mapping function(s), (iii) physical space acoustics-to-filter mapping function(s), or (iv) any combination thereof. How the feature-filter mapping functions, the audio output device-to-filter mapping functions, and the physical space acoustics-to-filter mapping functions are generated, provisioned, an applied is described in more detail below.

Still referring to FIG. 1 and FIG. 4, query vector receiver 402 operates to receive a query audio track feature vector 401-2. A query audio track feature vector 401-2 may include track vector components based on one or more feature sets corresponding to a query audio track (e.g., a media content item 230 being streamed by media playback device 102).

Audio output device detector 408 operates to obtain an audio output device type associated with a type of audio output device of a media playback device playing the query audio track 401. In an example implementation, the audio output device type is represented by an audio output device type identifier. The sound processor 404 operates to apply an audio output device-to-filter mapping function to the query audio track according to the audio output device type (e.g., based on its audio output device identifier). In some embodiments, the audio output device-to-filter mapping function is stored in mapping function store 412. In some embodiments, the audio output device-to-filter mapping function is received along with a query audio track feature vector 401-2 accompanying a query audio track 401 (e.g., contained in the query audio track feature vector 401-2). In example use cases, the type of audio output device 420 is any one of (i) a headphone (420-2) or (ii) one or more speakers (420-1, 420-3, . . . , **420-*n***).

In some embodiments, media playback device 102 receives one or more physical space acoustics-to-filter mapping functions from a remote server such as the audio filter server 300 described in connection with FIG. 2 and FIG. 3.

In some embodiments, an acoustic frequency response analyzer 406 operates to obtain physical space acoustics features associated with a physical space. In turn, sound processor 404 operates to apply the physical space acoustics-to-filter mapping function to a query audio track based on the physical space acoustics features. In an example use case, the physical space acoustics features are associated with the physical space in which the query audio track is playing.

In some embodiments, query vector receiver 402 operates to obtain a query audio track feature vector 401-2 corresponding to a query audio track 401, where the query audio track feature vector 401-2 is based on any one or a combination of the feature sets associated with the query audio track 401. In turn, sound processor 404 operates to apply a mapping function to the query audio track feature vector 401-2 to identify at least one audio filter 411 corresponding to the query audio track, and apply the at least one audio filter 411 to the query audio track 401.

In some embodiments, when a media content item is selected for playback, filter selector 400 operates to apply a predetermined (e.g., default) filter by using the mapping function stored on the media playback device 102 to select the predetermined filter. In some embodiments, selectable options are presented via the media playback device 102. For example, multiple audio filter options can be presented via display device 132 of media playback device 102. In turn, a user selects a filter from available filters 411 (referred to as a filter selection operation) via user input device 130. The selected filter is then applied to the media content item to be played back.

In some embodiments, the audio filter can be applied to a media context 403, such as a playlist, album, search result list, etc., without requiring a selection for each media content item in the media content context. In an example implementation, the sound processor 404 operates to apply the audio filter to each audio track in a media context 403 including the query audio track 401. In another implementation, the sound processor 404 operates to automatically apply different audio filters to each audio track in the media context 403, where the audio filters may vary.

In some embodiments, selectable options of mapping functions are presented via the media playback device 102. For example, one or more of (i) a feature-to-filter mapping function, (ii) an audio output device-to-filter mapping function, or (iii) a physical space acoustics-to-filter mapping function may be presented via the media playback device 102. A user may, in turn, select which mapping function to apply to the query audio track 401. In yet another embodiment, a user may select two or more mapping functions to apply to the query audio track 401, causing the filter selector 400 to determine which, if any, audio filters are in common across the selected mapping functions.

Example Media Delivery System

FIG. 2 illustrates a media delivery system according to an example embodiment. As shown in FIG. 2, media delivery system 104 includes a media content server 200 and an audio filter server 300. The media delivery system 104 includes one or more computing devices and provides media content to the media playback device 102 and, in some embodiments, other media playback devices as well. In addition, the media delivery system 104 interacts with the media playback device 102 to provide the media playback device 102 with various functionalities.

In at least some embodiments, the media content server 200 and the audio filter server 300 are provided by separate computing devices. In other embodiments, the media content server 200 and the audio filter server 300 are provided by the same computing device(s). Further, in some embodiments, the media content server 200 and the audio filter server 300 are provided by multiple computing devices. For example, the media content server 200 and audio filter server 300 may be provided by multiple redundant servers located in multiple geographic locations.

Although FIG. 2 shows a single media content server 200, and a single audio filter server 300, some embodiments include multiple media content servers and audio filter servers. In these embodiments, each of the multiple media content servers and audio filter servers may be identical or similar to the media content server 200 and the audio filter server 300, respectively, as described herein, and may provide similar functionality with, for example, greater capacity and redundancy and/or services from multiple geographic locations. Alternatively, in these embodiments, some of the multiple media content servers and/or the audio filter servers may perform specialized functions to provide specialized services. Various combinations thereof are possible as well.

The media content server 200 transmits stream media to media playback devices such as the media playback device 102 of FIG. 1. In some embodiments, the media content server 200 includes a media server application 212, a processing device 214, a memory device 216, and a network access device 218. The processing device 214 and the memory device 216 may be similar to the processing device 136 and the memory device 140, respectively, which have each been previously described. Therefore, the description of the processing device 214 and the memory device 216 are omitted for brevity purposes.

The network access device 218 operates to communicate with other computing devices over one or more networks, such as the network 110. Examples of the network access device 218 include one or more wired network interfaces and wireless network interfaces. Examples of such wireless network interfaces of the network access device 218 include wireless wide area network (WWAN) interfaces (including cellular networks) and wireless local area network (WLANs) interfaces. In other examples, other types of wireless interfaces can be used for the network access device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more media streams 232A, 232B, and 232N (collectively 232).

The media application interface 224 can receive requests or other communication from media playback devices or other systems, such as the media playback device 102, to retrieve media content items 230 from the media content server 200. For example, in FIG. 2, the media application interface 224 receives communication from the media playback device 102 to receive media content from the media content server 200.

In some embodiments, the media data store 226 stores media content items 234, media content metadata 236, media contexts 238, user accounts 240, and taste profiles 242. The media data store 226 may comprise one or more databases and file systems. Other embodiments are possible as well.

In an example implementation, the media content items 234, media content metadata 236, media contexts 238, user accounts 240, and/or taste profiles 242 stored in media data store 226 is/are used for generating training audio track feature vectors as described herein.

As discussed herein, the media content items 234 (including the media content items 230) may be audio, video, or any other type of media content, which may be stored in any format for storing media content.

The media content metadata 236 provides various information associated with the media content items 234. In addition, or alternatively, the media content metadata 236 provides various information associated with the media contexts 238. In some embodiments, the media content metadata 236 includes one or more of title, artist name, album name, length, genre, mood, era, etc.

Audio recordings can include tracks. A track is an audio recording. A podcast is an audio or audio/visual recording. Because a podcast includes audio content, the audio portion of a podcast can be processed as a track as well. Typically, the audio recording is a recording of a piece music (e.g., a song). Tracks are often associated with lyrics and metadata. Lyrics refer to vocalized content of the tracks. Most commonly, the vocalized content corresponds to the words of the track, which are typically sung, spoken, or rapped. Track metadata can contain information such as track length, track identifier (e.g., a unique identifier of the track), and track location (e.g., where it is stored).

In some embodiments, the media content metadata 236 includes acoustic metadata, cultural metadata, and explicit metadata. The acoustic metadata may be derived from analysis of a track and refers to a numerical or mathematical representation of the sound of a track. Acoustic metadata may include temporal information such as tempo, rhythm, beats, downbeats, tatums, patterns, sections, or other structures. Acoustic metadata may also include spectral information such as energy, cepstral coefficients, fundamental frequency, melody, pitch, harmony, timbre, chroma, loudness, brightness, vocalness, a spatial location of a sound source recorded on the audio track, or other possible features.

Acoustic metadata may include ensemble features and instrument features. An ensemble feature is a feature representing the extent to which a sample of an audio track includes a female solo, male solo, female duet, male duet, mixed duet, female group, male group or instrumental. An instrument feature is a feature representing the extent to which a sample of an audio track includes an acoustic guitar, electric guitar, bass, drums, harmonica, organ, piano, synthesizer, horn, or saxophone.

Acoustic metadata may take the form of one or more vectors (also referred to as feature vectors), matrices, lists, tables, and other data structures. Acoustic metadata may be derived from analysis of the music signal.

One form of acoustic metadata, commonly termed an acoustic fingerprint, may uniquely identify a specific track. Other forms of acoustic metadata may be formed by compressing the content of a track while retaining some or all of its musical features.

Cultural metadata refers to text-based information describing listeners' reactions to a track or song, such as styles, genres, moods, themes, similar artists and/or songs, rankings, etc. Genre, for example, is a feature representing the extent to which a sample of an audio track belongs to one or more genres including, Alternative, Blues, Country, Electronic/Dance, Folk, Gospel, Jazz, Latin, New Age, R&B, Soul, Rap, Hip-Hop, Reggae, Rock or others.

Cultural data may also refer to emotional quality, vocal quality, sound quality, and situational quality. An emotional quality is a feature representing the extent to which a sample of an audio track is intense, happy, sad, mellow, romantic, heartbreaking, aggressive, or upbeat, etc. A vocal quality is a feature representing the extent to which a sample of an audio track contains a sexy voice, a smooth voice, a powerful voice, a great voice, or a soulful voice, etc. A sound quality represents the extent to which a sample of an audio track has a strong beat, is simple, has a good groove, is speech like, or emphasizes a melody, etc. A situational quality is a feature representing the extent to which a sample of an audio track is good for a workout, a shopping mall, a dinner party, a dance party, slow dancing, studying, etc.

Metadata may also include environment metadata such as data about the physical space in which a media content item is being played back. A physical space acoustics feature is a feature representing a frequency response of a physical space, a time-based audio effect of a physical space (E.g., reverberation, echo), a background noise level of a room, etc.

Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners. Explicit data can be used, for example, as the basis for a media context 238 to identify one or more media content items.

At least some of the media content metadata 236, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML files, for example, or any other appropriate file type. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

One or more media content items can be grouped and identified as a whole as a media context to provide a particular context to the group of media content items. Examples of media contexts include playlists, albums, artists, stations, search result lists, and other things suitable to suggest context of media playback. In some examples, a media context includes one or more media content item identifiers for identifying the media content items associated with the media context. In some examples, a media context itself is identifiable through use of an identifier of the media content (also referred to herein as a media context identifier) and retrievable for playback via use of the media context identifier thereof.

Referring still to FIG. 2, each of the media contexts 238 is used to identify one or more media content items 230. In some embodiments, the media contexts 238 are configured to group one or more media content items 230 and provide a particular context to the group of media content items 234. Some examples of the media contexts 238 include albums, artists, playlists, and individual media content items. By way of example, where a media context 238 is an album, the media context 238 can represent that the media content items 230 identified by the media context 238 are associated with that album.

As described above, the media contexts 238 can include playlists 239. The playlists 239 are used to identify one or more of the media content items 230. In some embodiments, the playlists 239 identify a group of the media content items 230 in a particular order. In other embodiments, the playlists 239 merely identify a group of the media content items 230 without specifying a particular order. Some, but not necessarily all, of the media content items 230 included in a particular one of the playlists 239 are associated with a common feature such as a common genre, mood, or era.

In some embodiments, a user can listen to media content items in a playlist 239 by selecting the playlist 239 via a media playback device, such as the media playback device 102. The media playback device then operates to communicate with the media delivery system 104 so that the media delivery system 104 retrieves the media content items identified by the playlist 239 and transmits data for the media content items to the media playback device for playback.

At least some of the playlists 239 may include user-created playlists. For example, a user of a media streaming service provided using the media delivery system 104 can create a playlist 239 and edit the playlist 239 by adding, removing, and rearranging media content items in the playlist 239. A playlist 239 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 104 operates to generate a list of media content items recommended for the particular user or the particular group of users. In some embodiments, such recommended media content items can be selected based at least on the taste profiles 242 as described herein. Other information or factors can be used to determine the recommended media content items.

The user accounts 240 are used to identify users of a media streaming service provided by the media delivery system 104. In some embodiments, a user account 240 allows a user to authenticate to the media delivery system 104 and enable the user to access resources (e.g., media content items, playlists, etc.) provided by the media delivery system 104. In some embodiments, the user can use different devices to log into the user account and access data associated with the user account in the media delivery system 104. User authentication information, such as a username, an email account information, a password, and other credentials, can be used for the user to log into his or her user account. It is noted that, where user data is to be protected, the user data is handled according to robust privacy and data protection policies and technologies. For instance, whenever personally identifiable information and any other information associated with users is collected and stored, such information is managed and secured using security measures appropriate for the sensitivity of the data. Further, users can be provided with appropriate notice and control over how any such information is collected, shared, and used.

The taste profiles 242 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to obtain music preferences.

In some embodiments, each taste profile 242 is a representation of musical activities, such as user preferences and historical information about the users' consumption of media content, and can include a wide range of information such as artist plays, song plays, dates of listen by the user, songs per day, playlists, play counts, playback actions (e.g., start/stop/skip) for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy," etc.

In addition, the taste profiles 242 can include other information. For example, the taste profiles 242 can include libraries and/or playlists of media content items associated with the user. The taste profiles 242 can also include information about the user's relationships with other users (e.g., associations between users that are stored by the media delivery system 104 or on a separate social media site).

The taste profiles 242 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another example use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another example of taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another example use case for taste profiles is referred to as user-to-user recommendation. This API call is used to discover users with similar tastes by comparing the similarity of taste profile item(s) associated with users.

A taste profile 242 can represent a single user or multiple users. Conversely, a single user or entity can have multiple taste profiles 242. For example, one taste profile can be generated in connection with a user's media content play activity, whereas another separate taste profile can be generated for the same user based on the user's selection of media content items and/or artists for a playlist.

Example Audio Filter Server

Figure 3:
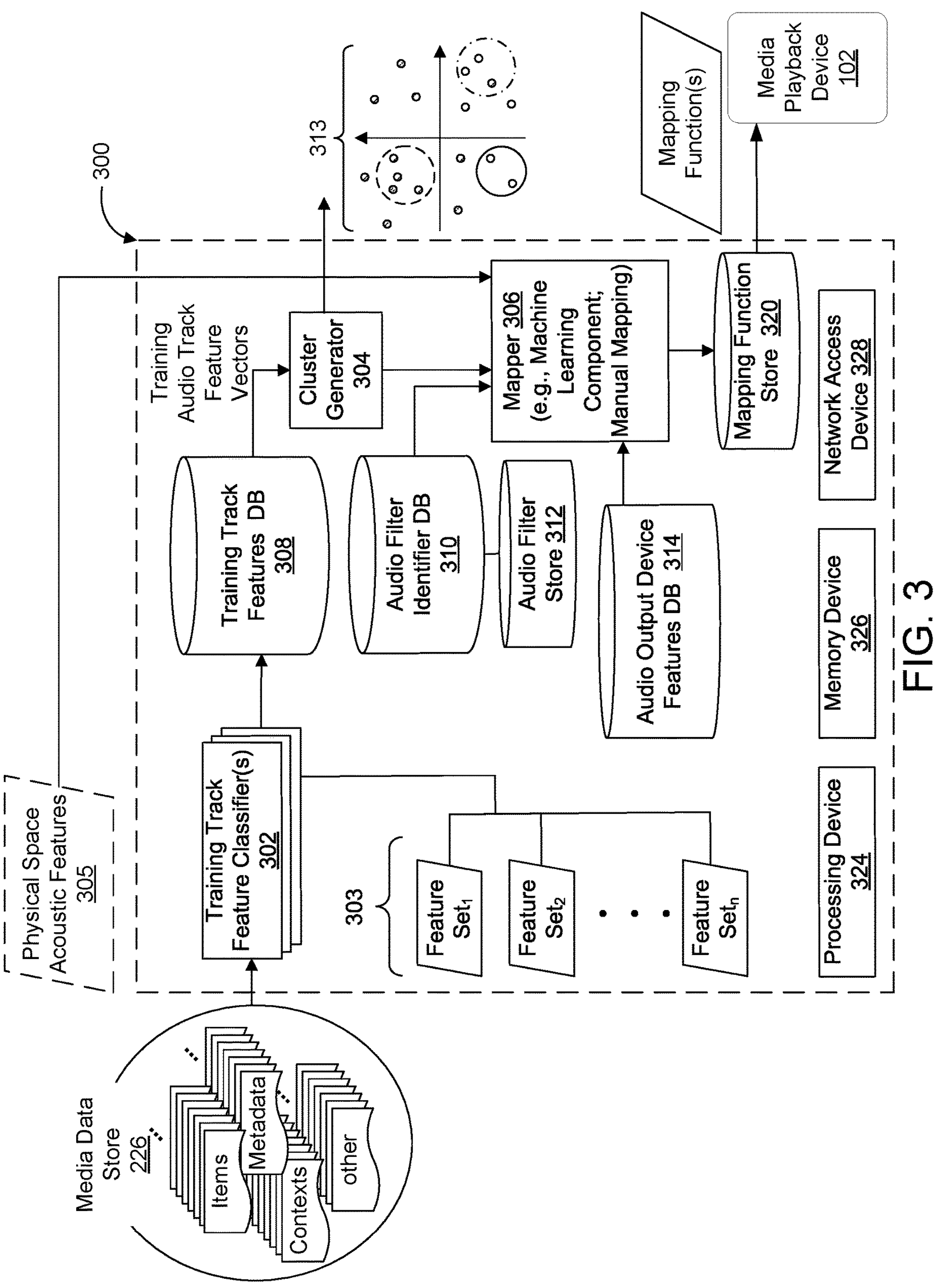
FIG. 3 illustrates an example audio filter server in accordance with an example embodiment.

FIG. 3 illustrates an example audio filter server 300 in accordance with an example embodiment. Audio filter server 300, in some embodiments, operates to generate one or more mapping functions and to provision a media playback device 102 with the one or more mapping functions.

In some embodiments, the components and features of the audio filter server 300 are incorporated into the media playback device 102.

In an example embodiment, audio filter server 300 includes a processing device 324, a memory device 326, and a network access device 328. The processing device 324, the memory device 326, and network access device 328 may be similar to the processing device 136, the memory device 140, and the network access device 218 respectively, which have each been previously described. Therefore, the description of the processing device 324, the memory device 326 and network access device 328 are omitted for brevity purposes.

Audio filter server 300 further includes a training track feature classifier 302, a cluster generator 304, a mapper 306, a training track features database 308, an audio filter identifier database 310, an audio filter store 312, and a mapping function store 320.

A training track feature classifier 302 operates to generate a training audio track feature vector for each training audio track of a plurality of training audio tracks. In some embodiments, the training audio track feature vector includes training track vector components based on one or more feature sets 303 (e.g., Feature Set1, Feature Set2, . . . , Feature Setn). Each of the one or more feature sets 303 may be generated by a corresponding training track feature classifier 302. In some embodiments, the training audio track feature vectors are stored in a training track features database 308.

Cluster generator 304 operates to group each of the training track vector components of the training audio track feature vector into clusters 313 as shown in FIG. 3.

Mapper 306 operates to map audio filters to one or more of the plurality of clusters 313. The result is a feature-to-filter mapping function from each training audio track feature vector to at least one audio filter.

Mapper 306, in an example implementation, includes a machine learning component configured to map the audio filters to the clusters. The machine learning component can operate according to now known or future developed machine learning clustering mechanisms (e.g., density-based methods, hierarchical based methods, partitioning methods, grid-based methods, K-means clustering methods, and the like). Alternatively, mapping of filters to the clusters may be performed manually by an operator via a user interface.

An audio filter identifier is an alphanumerical value that can be used to identify or refer to a particular audio filter. In an example implementation, the audio filters are identified by filter identifiers stored in audio filter identifier database 310. Thus, in this example implementation, mapper 306 operates to map audio filters using audio filter identifiers to one or more of the plurality of clusters 313.

The audio filters themselves can be, in an example implementation, stored in audio filter store 312.

Mapping function store 320 operates to store the mapping function(s).

In some embodiments, mapper 306 further operates to map a second set of audio filters to a plurality of types of audio output devices such as the audio output devices 420 shown in FIG. 4. The mapper 306 may further operate to build an audio output device-to-mapping function from each type of audio output device to the second set of audio filters (e.g., one or more audio filters). Mapping function store 320 can further store the audio output device-to-filter mapping function(s) generated by mapper 306.

The audio output device features corresponding to audio output devices may be stored in audio output device features database 314. In an example implementation, the type of audio output device 420 is any one of (i) a headphone 420-2 or (ii) one or more speakers 420-1, 420-3, . . . , **420-*n* as shown in FIG. 4**.

The audio filter server 300 further operates to provision the media playback device 102 with a copy of the audio output device-to-filter mapping function(s).

This enables a media playback device 102 enabled to apply the audio output device-to-filter mapping function to a query audio track to select a filter from the second set of filters and, in turn, apply the selected filter to the query audio track.

In an example implementation, a query audio track feature vector 401-2 includes track vector components based on one or more feature sets corresponding to a query audio track (e.g., one of the media content items 230 being streamed by media playback device 102).

In some embodiments, mapper 306 further operates to map a third set of audio filters to physical space acoustics features (305), thereby building a physical space acoustics-to-filter mapping function from each of the plurality of physical space acoustics features to the second set of audio filters (e.g., one or more audio filters).

Audio filter server (300) further operates to provision the physical space acoustics-to-filter mapping function to a media playback device 102. This enables a media playback device enabled to apply the physical space acoustics-to-filter mapping function to a query audio track to select an audio filter from the third set of audio filters and apply that filter to the query audio track.

Physical space acoustics features representing a physical space in which the query audio track is playing can be obtained in a manner now known or future developed. This is referred to as measuring a frequency response of a physical space.

Figure 5:
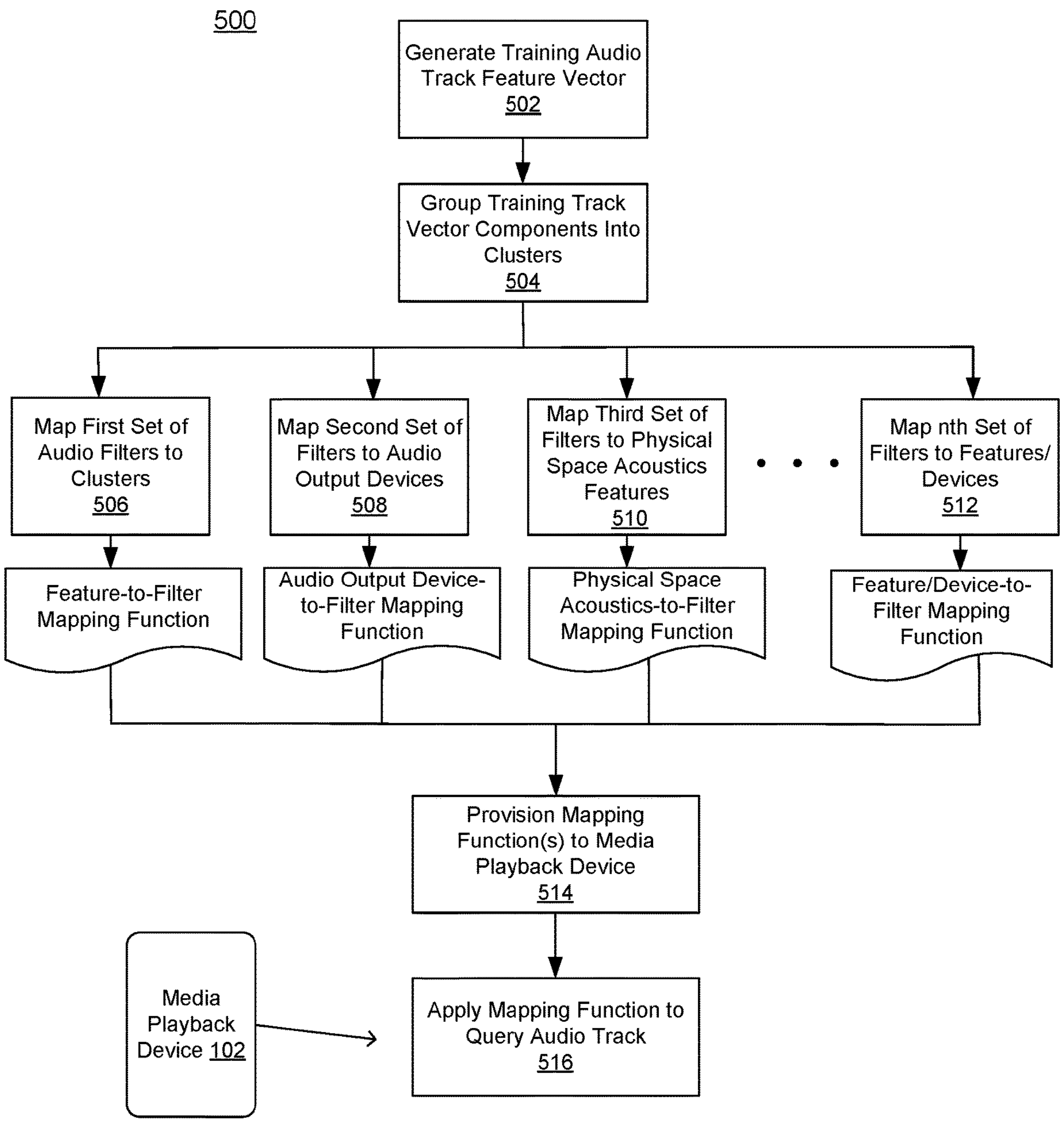
FIG. 5 illustrates an example filter selection procedure in accordance with an example embodiment.

FIG. 5 illustrates an example filter selection procedure 500 in accordance with an example embodiment. Generally, one or more mapping functions are generated. In turn, the mapping function(s) are provisioned to a media playback device enabled to apply the mapping function to a query audio track to select a filter from a set of audio filters. A media playback device receives the mapping function(s). This enables the media playback device to receive a query audio track feature vector corresponding to a query audio track and, in turn, apply a particular mapping function to the query audio track feature vector to identify an audio filter corresponding to the query audio track. The media playback device can then apply the audio filter to the query audio track. For example, upon a request by a user to listen to a particular audio track (i.e., the query audio track) the media playback device applies the audio filter when playing back the audio track.

The media playback device can be provisioned with different types of mappings, enabling the media playback device to have multiple audio filter options. The media playback device may further be configured to provide a user a group of selectable audio filters to choose from (e.g., via the user input device of the media playback device).

In some embodiments, for each training audio track of a plurality of training audio tracks a training audio track feature vector generating operation 502 performs generating a training audio track feature vector including training track vector components based on one or more feature sets. Also, for each training audio track a grouping operation 504 performs grouping each of the training track vector components of the training audio track feature vector into at least one of plural clusters.

In turn, a feature-to-filter mapping operation 506 performs mapping a first set of audio filters to one or more of the clusters. This results in the building of a feature-to-filter mapping function from each training audio track feature vector to at least one audio filter. In turn a provisioning operation 514 performs provisioning the feature-to-filter mapping function to a media playback device.

The filter selection procedure 500 further may involve an audio output device to-filter mapping operation 508 that performs mapping a second set of audio filters to a plurality of types of audio output devices. This results in building an audio output device to-filter mapping function from each type of audio output device to the second set of audio filters (e.g., one or more audio filters).

In turn the provisioning operation 514 performs provisioning the audio output device-to-filter mapping function to the media playback device.

In some embodiments, an audio output device determination operation performs obtaining an audio output device type associated with a type of audio output device of the media playback device. In turn, the media playback device enabled to apply the audio output device-to-filter mapping function to the query audio track according to the audio output device type. In some embodiments, the type of audio output device is any one of (i) a headphone or (ii) one or more speakers.

In some embodiments, the filter selection procedure 500 further involves a physical space acoustics-filter mapping operation 510 that performs mapping a third set of audio filters to physical space acoustics features. This results in the building of a physical space acoustics-filter mapping function from each of the plurality of physical space acoustics features to the third set of audio filters (e.g., one or more audio filters).

In turn the provisioning operation 514 performs provisioning the physical space acoustics-to-filter mapping function to the media playback device. In an example implementation, a physical space response operation performs obtaining a physical space acoustics feature representing a physical space. In turn, the media playback device is enabled to apply the physical space acoustics-to-filter mapping function to the query audio track based on the physical space acoustics feature representing the physical space.

Additional mappings of sets of filters to other features or devices may be performed and still be within the scope of the embodiments described herein as illustrated by mapping operation 512.

A media playback device provisioned with the mapping function(s) may receive a query audio track and execute a filter application operation 516 which performs applying one or more of the filters selected by the mapping function(s) to the query audio track.

Example Implementation

As explained above, when using headphones, the sound may appear to be localized in the head and the sound field is flat and lacking the sensation of dimensions. Moreover, audio tracks can be created to be listened using a headphone.

One phenomenon particular to headphones is often referred in literature as lateralization, meaning "in-the-head" localization. Long-term listening to lateralized sound may lead to listening fatigue. Lateralization occurs, because the information the human auditory system relies on when positioning the sound sources is missing or ambiguous. The problem is emphasized on the recording material, that is originally intended to be played via multi-speaker systems. The opposite of the lateralization phenomenon is referred to as externalization. "Externalization" or "sound externalization" as used herein means the ability to attribute auditory signals to external sources and perceive them located at some distance or simply "out-of-head" localization.

"Headphone sound externalization" more specifically refers to a signal processing technique that makes sounds being played on headphones appear as though the sound source is outside the head, as opposed to directly in the ears. Powerful digital signal processing algorithms have been used in conjunction with the theory of psychoacoustics to reduce lateralization. However, audio tracks can sound or otherwise be perceived differently depending on the processing algorithm used. That is, there can be different "flavors" of externalization for a particular audio track. Altering the sound usually introduces tonal changes that can not only sound very different, but even be annoying and make the outcome worse than the original unprocessed audio.

The problem is that there is no way to know which flavor of externalization (i.e., which audio filter) to choose for each audio track without listening tests. This typically results in a more conservative setting overall than an optimization where the flavor is picked individually based on the feature of the audio content.

Existing solutions are somewhat non-technical in that they involve subjective measures obtained through listening tests performed by people. Such subjective measures include, for example, phones and sones for sound level. Perceived sound frequency has also many different scales, some derived from listening tests, others having connections to auditory models and physiological features of the cochlea in the inner ear. For subjective frequency scales, most commonly used are the so-called Bark, Mel or ERB scales. Data corresponding to the flavor of externalization that testers choose is analyzed. However, oftentimes, the testers end up choosing a particular flavor of externalization randomly or making too conservative of a decision. Thus, not only is such testing too subjective, but it is also not scalable. Moreover, the data necessary to analyze the flavors testers choose is oftentimes not available. In sum, the confidence level that the subjective testers will choose the correct flavor of externalization is relatively low.

In an example implementation, audio tracks are preprocessed in the backend (e.g., on media delivery system 104 of FIG. 2 and FIG. 3) to determine in advance which is the best audio filter for each audio track (e.g., each song). This information is sent as metadata to a client device (e.g., a media playback device 102 of FIG. 1) to enable the client device the ability to automatically select the best audio filter.

Figure 6:
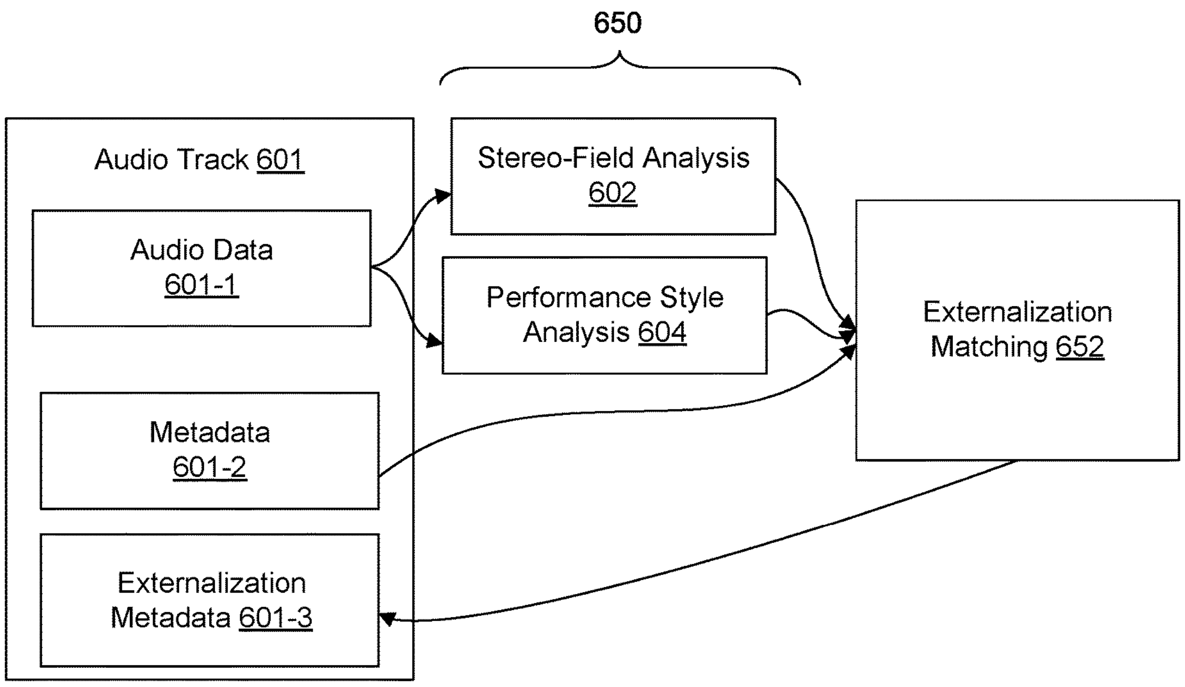
FIG. 6 is a diagram of a track ingestion process for performing externalization matching according to an example embodiment.

FIG. 6 is a diagram of a track ingestion process for performing externalization matching according to an example embodiment. In this implementation, an audio track 601 includes three components, audio data 601-1, metadata 601-2, and externalization metadata 601-3. The audio data 601-1 includes the content of the audio track 601. The metadata 601-2 includes data representing information associated with the audio track 601 such as title, artist name, album name, length, genre, mood, era, acoustic metadata, cultural metadata, and explicit metadata as described above. Externalization metadata 601-3 includes data based on one or more feature sets associated with the audio track 601. The externalization metadata 601-3 can be used by the client device (e.g., media playback device 102) to select an audio filter that in turn can be applied to the audio data 601-1 during playback.

In an example embodiment, a feature collection operation 650 performs collecting features of the audio track 601 that have an impact on how the externalization is perceived when applied to various externalization audio filters. For example, one feature is the stereo image of the audio data. The stereo image refers to the perceived spatial locations of the sound sources, both laterally and in depth. In this example implementation, a stereo field analysis operation 602 performs collecting features corresponding to the stereo image of the audio data. Other non-limiting features of the audio track can be collected such as performance style e.g., vocal, instruments, tempo, rhythm, or more subjective aspects such as genre. As shown in FIG. 6, a performance style analysis operation 604 performs determining performance style features based on the audio data 601-1 of the audio track 601.

Feature collection operation 650 is performed on multiple audio tracks in the backend (e.g., audio tracks stored on media data store 226 of FIG. 2) by a combination of signal processing/machine learning and aggregation of metadata now known or future developed.

In an example implementation, the feature collection operation 650 includes an audio track transformation sub-operation that performs transforming the audio waveform of each track into a vector. In the example implementation shown in FIG. 6, the feature collection operation 650 transforms the audio waveform of each track into a vector that represents the features of the stereo image and performance style. It should be understood that other features of the audio track can be obtained and included in the vector, such that the waveform of each track is transformed into a vector that represents multiple features of the audio track.

In some embodiments, the feature collection operation 650 includes a metadata collection operation that performs collecting metadata 601-2 of the audio track 601. In an example implementation, the metadata includes genre. This information can be received from pre-existing databases (e.g., media content metadata 236 of FIG. 2).

In some embodiments, the feature collection operation 650 includes an audio attribute collection operation that performs collecting audio attributes of the audio track 601 that have been pre-calculated as part of an ingestion process.

The results are saved in a database (e.g., on media data store 226 of FIG. 2) so that every audio track has a feature vector.

All the input variables obtained from the feature collection operation 650 are then grouped into clusters and an externalization audio filter is mapped to each cluster. In an example implementation, the mapping process of externalization audio filter can be accomplished by performing a limited number of listening tests of tracks representing the clusters. The listening tests can be manually performed by humans. Alternatively, the listening tests can be performed automatically by using audio analysis tools that are now known or future developed.

The clustering can be performed on a subset of a catalog of audio tracks. In an example implementation, the catalog represents different types of music available, so that the results can be applied on the entire catalog. The outcome of this process is used to build the mapping function from a feature vector to one or more externalization audio filters, as shown by externalization matching operation 652.

In an example implementation, when the audio track 601 is about to be played in the client, externalization matching operation 652 performs collecting the information from the database and providing externalization metadata 601-3 along with more metadata 601-2. The externalization metadata 601-3 includes information sufficient to enable the client device to select an audio filter (e.g., in the form of a vector such as feature vector 401-2 described above in connection with FIG. 4). The metadata 601-2 can contains additional information such as track genre, user preferences, the audio track's media context, etc., which are used to select an appropriate externalization audio filter.

As explained above, media context can be a track list that the audio track is being played from. For example, when playing a playlist every song can be played back with its ideal externalization audio filter. However, when playing an album it might be beneficial to use the same externalization audio filter for all tracks even if the previously described matching process determined otherwise.

There are several ways to perform the above operations both regarding where and when an audio track is processed, as well as if the data used to perform the externalization matching is already in the client or collected.

Figure 7:
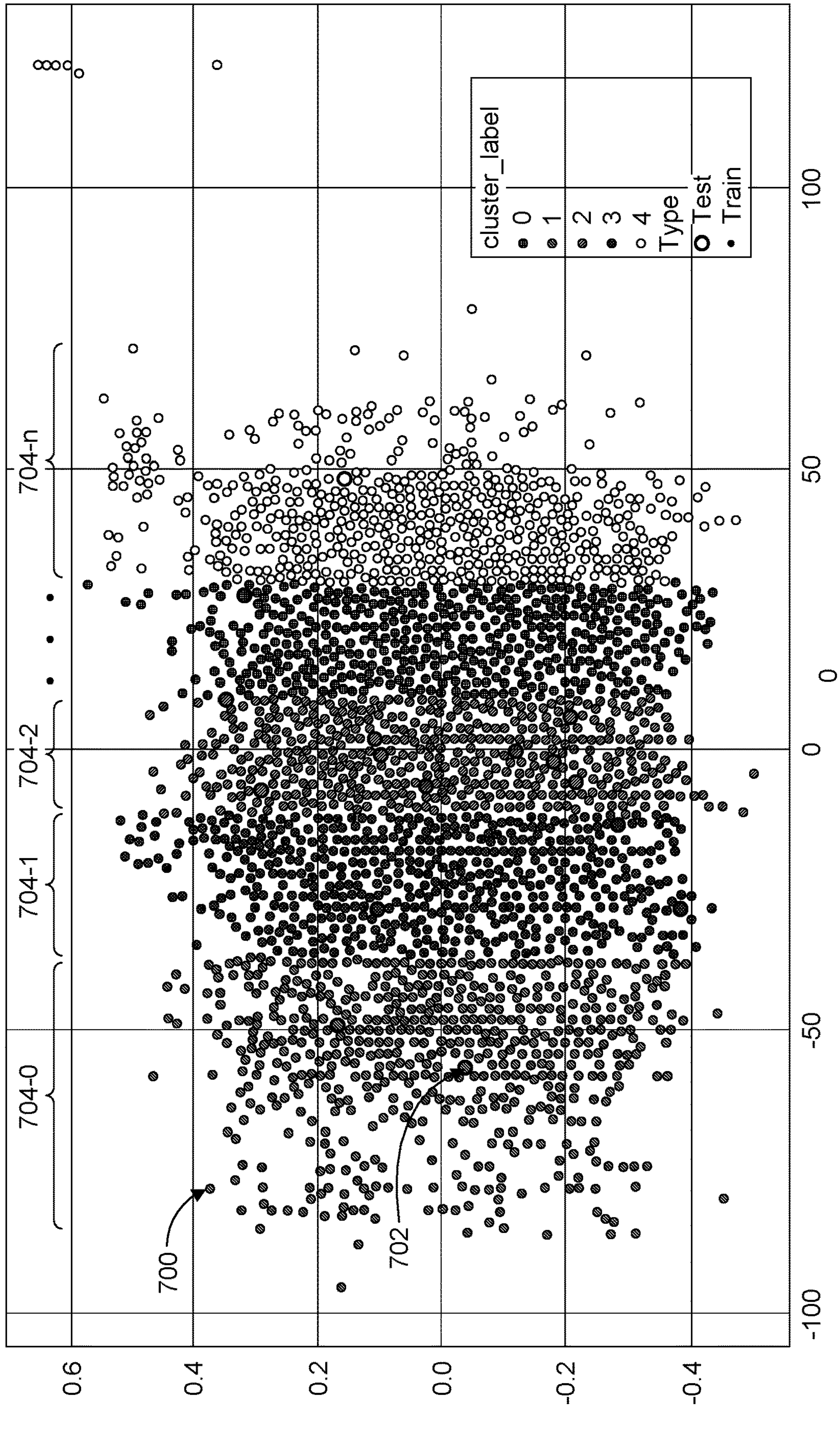
FIG. 7 is an example of cluster analysis on stereo-field vectors according to an example use case.

FIG. 7 is an example of cluster analysis on stereo-field vectors according to an example use case. An audio track 700 is represented as dots in a catalog. Here, sixteen (16) dimensions have been reduced to two (2) just for simplicity. Test tracks 702 (also referred to as query tracks) are represented as larger dots. The test tracks 702, in this example implementation, represents a test track that has been used in a listening test to determine the best externalization audio filter. FIG. 7 also shows different clusters 704-1, 704-2, . . . , 704-*n*. Each of the clusters 704-1, 704-2, . . . , 704-*n* represents particular externalization features determined by the above-described mapping, which in turn, can be used to map to a particular externalization audio filter.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above-described example embodiments, but should be defined only in accordance with the following claims and their equivalents.

In addition, not all of the components are required to practice the invention, and variations in the arrangement and type of the components may be made without departing from the spirit or scope of the invention. As used herein, the term "component" is applied to describe a specific structure for performing specific associated functions, such as a special purpose computer as programmed to perform algorithms (e.g., processes) disclosed herein. The component can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

In addition, FIGS. 1-7 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method for performing sound filtering selection, comprising:

for each training audio track of a plurality of training audio tracks:

generating a training audio track feature vector including a plurality of training track vector components based on one or more feature sets;

grouping each of the plurality of training track vector components of the training audio track feature vector into at least one of a plurality of clusters;

mapping a first set of audio filters to one or more of the plurality of clusters, thereby building a feature-to-filter mapping function from each training audio track feature vector to at least one audio filter; and provisioning the feature-to-filter mapping function to a media playback device enabled to apply the feature-to-filter mapping function to a query audio track to select a filter from the first set of audio filters.

2. The method for performing sound filtering selection according to claim 1, further comprising:

mapping a second set of audio filters to a plurality of types of audio output devices, thereby building an audio output device-to-filter mapping function; and provisioning the audio output device-to-filter mapping function to the media playback device, wherein a mobile device is enabled to apply the audio output device-to-filter mapping function to the query audio track to select a filter from the second set of audio filters.

3. The method for performing sound filtering selection according to claim 2, further comprising:

obtaining an audio output device type associated with a type of audio output device of the media playback device; and causing the media playback device applying the audio output device-to-filter mapping function to the query audio track according to the audio output device type.

4. The method for performing sound filtering selection according to claim 3, wherein the type of audio output device is any one of (i) a headphone or (ii) one or more speakers.

5. The method for performing sound filtering selection according to claim 1, further comprising:

mapping a third set of audio filters to a plurality of physical space acoustics features, thereby building a physical space acoustics-to-filter mapping function; and provisioning the physical space acoustics-to-filter mapping function to the media playback device, wherein a mobile device is enabled to apply the physical space acoustics-to-filter mapping function to the query audio track to select a filter from the third set of audio filters.

6. The method for performing sound filtering selection according to claim 5, further comprising:

obtaining a physical space acoustics feature representing a physical space; and causing the media playback device to apply the physical space acoustics-to-filter mapping function to the query audio track based on the physical space acoustics feature representing the physical space in which the query audio track is playing.

7. The method for performing sound filtering selection according to claim 1, further comprising:

obtaining a query audio track feature vector corresponding to the query audio track, wherein the query audio track feature vector is based on any one or a combination of the feature sets associated with the query audio track;

applying the feature-to-filter mapping function to the query audio track feature vector to identify at least one audio filter corresponding to the query audio track; and causing the media playback device to apply the at least one audio filter to the query audio track.

8. The method for performing sound filtering selection according to claim 7, further comprising:

causing the media playback device to apply the at least one audio filter to each audio track in a media context including the query audio track.

9. The method for performing sound filtering selection according to claim 1, wherein the one or more feature sets for each of the training audio tracks include any one of: (i) an acoustic vector of the training audio track, (ii) an emotional quality vector of the training audio track, (iii) a vocal quality vector of the training audio track, (iv) a sound quality vector of the training audio track, (v) a situational quality vector of the training audio track, (vi) a genre vector of the training audio track, (vi) an ensemble vector of the training audio track, or (vii) an instrument vector of the training audio track, or (viii) or a combination thereof.

10. A system for performing sound filtering selection, comprising:

a training track feature classifier operable to, for each training audio track of a plurality of training audio tracks, generate a training audio track feature vector including a plurality of training track vector components based on one or more feature sets;

a cluster generator operable to group each of the plurality of training track vector components of the training audio track feature vector into at least one of a plurality of clusters;

a mapper operable to map a first set of audio filters to one or more of the plurality of clusters, thereby building a feature-to-filter mapping function from each training audio track feature vector to at least one audio filter;

a mapping function store operable to store the feature-to-filter mapping function; and an audio filter server operable to provision the feature-to-filter mapping function to a media playback device enabled to apply the feature-to-filter mapping function to a query audio track.

11. The system according to claim 10, wherein:

the mapper is further operable to map a second set of audio filters to a plurality of types of audio output devices, thereby building an audio output device-to-filter mapping function; and the audio filter server is further operable to provision the audio output device-to-filter mapping function to the media playback device, wherein the media playback device is enabled to apply the audio output device-to-filter mapping function to the query audio track.

12. The system according to claim 11, further comprising:

an audio output device detector operable to obtain an audio output device type associated with a type of audio output device of the media playback device; and a sound processor operable to apply the audio output device-to-filter mapping function to the query audio track according to the audio output device type.

13. The system according to claim 12, wherein the type of audio output device is any one of (i) a headphone or (ii) one or more speakers.

14. The system according to claim 10, further comprising:

the mapper further operable to map a third set of audio filters to a plurality of physical space acoustics features, thereby building a physical space acoustics-to-filter mapping function; and an audio filter server operable to provision the physical space acoustics-to-filter mapping function to the media playback device, wherein the media playback device is enabled to apply the physical space acoustics-to-filter mapping function to the query audio track.

15. The system according to claim 14, further comprising:

an acoustic frequency response analyzer operable to obtain a physical space acoustics feature representing a physical space; and a sound processor operable to apply the physical space acoustics-to-filter mapping function to the query audio track based on the physical space acoustics feature representing the physical space.

16. The system according to claim 10, further comprising:

a query vector receiver operable to obtain a query audio track feature vector corresponding to the query audio track, wherein the query audio track feature vector is based on any one or a combination of the feature sets associated with the query audio track; and a sound processor operable to:

apply the feature-to-filter mapping function to the query audio track feature vector to identify at least one audio filter corresponding to the query audio track, and apply the at least one audio filter to the query audio track.

17. The system according to claim 16, further comprising:

the sound processor further operable to apply the at least one audio filter to each audio track in a media context including the query audio track.

18. The system according to claim 10, wherein the one or more feature sets for each of the training audio tracks include any one of: (i) an acoustic vector of the training audio track, (ii) an emotional quality vector of the training audio track, (iii) a vocal quality vector of the training audio track, (iv) a sound quality vector of the training audio track, (v) a situational quality vector of the training audio track, (vi) a genre vector of the training audio track, (vi) an ensemble vector of the training audio track, or (viii) an instrument vector of the training audio track, or (vii) or a combination thereof.

19. A non-transitory computer-readable medium having stored thereon sequences of instructions, the sequences of instructions including instructions which when executed by one or more processors cause the one or more processors to perform:

for each training audio track of a plurality of training audio tracks:

generating a training audio track feature vector including a plurality of training track vector components based on one or more feature sets;

grouping each of the plurality of training track vector components of the training audio track feature vector into at least one of a plurality of clusters;

mapping a first set of audio filters to one or more of the plurality of clusters, thereby building a feature-to-filter mapping function from each training audio track feature vector to at least one audio filter; and provisioning the feature-to-filter mapping function to a media playback device enabled to apply the feature-to-filter mapping function to a query audio track to select a filter from the first set of audio filters.

20. The non-transitory computer-readable medium of claim 19, further having stored thereon a sequence of instructions for causing the one or more processors to perform:

mapping a second set of audio filters to a plurality of types of audio output devices, thereby building an audio output device-to-filter mapping function; and provisioning the audio output device-to-filter mapping function to the media playback device, wherein a mobile device is enabled to apply the audio output device-to-filter mapping function to the query audio track to select a filter from the second set of audio filters.

* * * * *